United States Patent
Okuda et al.

(10) Patent No.: US 12,442,572 B2
(45) Date of Patent: Oct. 14, 2025

(54) HEAT PUMP

(71) Applicant: Yanmar Power Technology Co., Ltd., Osaka (JP)

(72) Inventors: Norihiro Okuda, Osaka (JP); Terunori Aikawa, Osaka (JP); Hideshi Okada, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 194 days.

(21) Appl. No.: 17/914,030

(22) PCT Filed: Mar. 4, 2021

(86) PCT No.: PCT/JP2021/008360
§ 371 (c)(1),
(2) Date: Sep. 23, 2022

(87) PCT Pub. No.: WO2021/192885
PCT Pub. Date: Sep. 30, 2021

(65) Prior Publication Data
US 2023/0137037 A1  May 4, 2023

(30) Foreign Application Priority Data
Mar. 25, 2020  (JP) ................................ 2020-053961

(51) Int. Cl.
*F25B 41/20*  (2021.01)
*F25B 30/00*  (2006.01)

(52) U.S. Cl.
CPC .............. *F25B 41/20* (2021.01); *F25B 30/00* (2013.01); *F25B 2600/2501* (2013.01)

(58) Field of Classification Search
CPC .. F25B 41/20; F25B 30/00; F25B 2600/2501; F25B 43/006; F25B 2400/04;
(Continued)

(56) References Cited

U.S. PATENT DOCUMENTS

| | | | |
|---|---|---|---|
| 2005/0274132 A1* | 12/2005 | Ohta | F25B 9/008 62/217 |
| 2010/0199712 A1* | 8/2010 | Lifson | F25B 41/24 62/528 |
| 2015/0292780 A1* | 10/2015 | Kitamura | F25B 41/40 62/324.1 |

FOREIGN PATENT DOCUMENTS

| | | |
|---|---|---|
| JP | 11-316062 A | 11/1999 |
| JP | 2016-099067 A | 5/2016 |

(Continued)

OTHER PUBLICATIONS

English language translation of KR100767213. Translated May 2024 (Year: 2007).*

(Continued)

*Primary Examiner* — Cassey D Bauer
(74) *Attorney, Agent, or Firm* — NORTON ROSE FULBRIGHT US LLP

(57) ABSTRACT

A heat pump includes an indoor heat exchanger; an outdoor heat exchanger that is connected to the indoor heat exchanger; an accumulator that is connected to the outdoor heat exchanger; an evaporative heat exchanger that is provided between the outdoor heat exchanger and the accumulator; and a bypass circuit that that is configured to enable a refrigerant that has flowed out of the indoor heat exchanger to flow into the evaporative heat exchanger.

9 Claims, 4 Drawing Sheets

(58) Field of Classification Search
CPC ...... F25B 2400/0403; F25B 2600/2513; F25B 49/00; F25B 2400/19; F25B 2400/0409
See application file for complete search history.

(56) References Cited

FOREIGN PATENT DOCUMENTS

| | | | |
|---|---|---|---|
| JP | 2019-211207 A | 12/2019 | |
| KR | 100767213 B1 * | 10/2007 | ............ F25B 43/006 |

OTHER PUBLICATIONS

International Search Report dated Apr. 13, 2021 issued in corresponding PCT Application PCT/JP2021/008360.

* cited by examiner

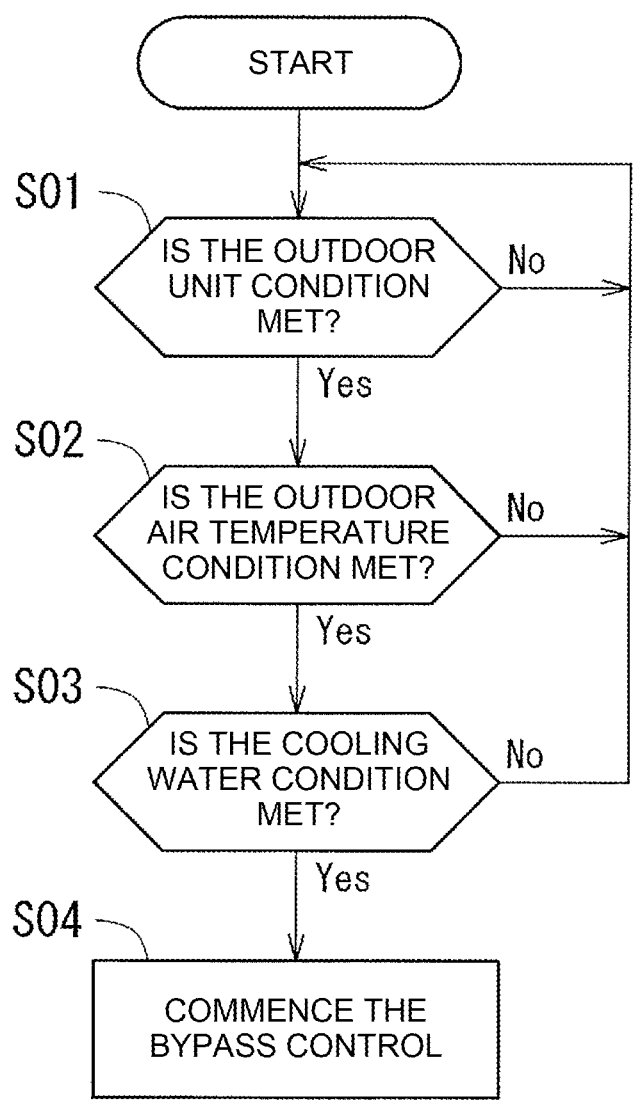

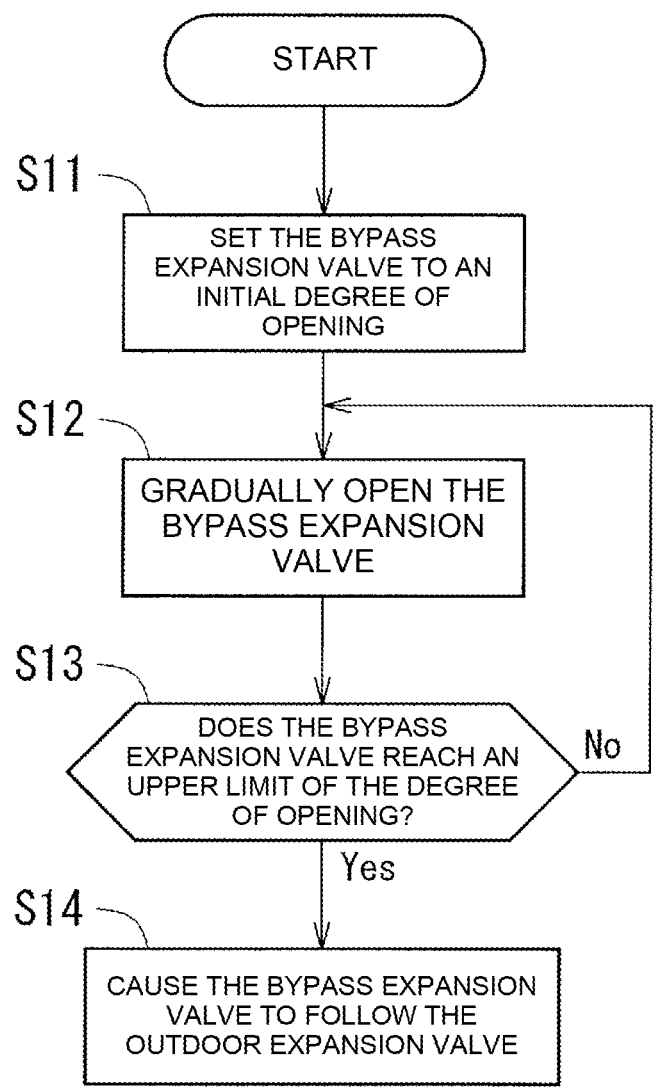

HEAT PUMP

CROSS-REFERENCE TO RELATED APPLICATIONS

This application is a national stage application pursuant to 35 U.S.C. § 371 of International Application No. PCT/JP2021/008360, filed on Mar. 4, 2021 which claims priority under 35 U.S.C. § 119 to Japanese Patent Application No. 2020-053961 filed on Mar. 25, 2020, the disclosures of which are hereby incorporated by reference in their entireties.

TECHNICAL FIELD

The present invention relates to a heat pump which circulates a refrigerant for cooling and heating.

BACKGROUND ART

Conventionally, a heat pump performs cooling and heating operations by exchanging heat of a refrigerant in a heat exchanger. Generally, in such a heat pump, during a heating operation the refrigerant is gasified by an indoor heat exchanger, liquefied by an outdoor heat exchanger, and returned to a compressor (see, Patent Literature 1, for example).

CITATION LIST

Patent Literature

Patent Literature 1: Japanese Patent Laid-Open Publication No. 2016-99067

DISCLOSURE OF INVENTION

Problems to be Solved by the Invention

The heat pump disclosed in Patent Literature 1 includes a compressor and an oil separator, and an open/close valve is provided in an oil return path to return oil from the oil separator to the compressor. In the above mentioned heat pump, since the outdoor heat exchanger is intended to carry out heat exchange for all the refrigerant, there is a case where the amount of refrigerant beyond the capacity of the outdoor heat exchanger flows into the outdoor heat exchanger, so that it has caused such a problem that the refrigerant cannot be fully evaporated.

The present invention is made to solve the problem mentioned above, and an object of the invention is to provide a heat pump capable of suppressing the refrigerant from excessively flowing into an outdoor heat exchanger.

Means for Solving the Problems

A heat pump of the present invention is provided with an indoor heat exchanger, an outdoor heat exchanger connected to the indoor heat exchanger, and an accumulator connected to the outdoor heat exchanger and circulates a refrigerant for cooling and heating, the heat pump includes: a first heat exchanger provided between the outdoor heat exchanger and the accumulator; and a bypass circuit to cause the refrigerant that flows out of the indoor heat exchanger to flow into the first heat exchanger.

The heat pump of the present invention may be configured such that the bypass circuit branches from a path connecting the indoor heat exchanger and the outdoor heat exchanger and is connected to an upstream of the first heat exchanger in a refrigerant delivery direction.

The heat pump of the present invention may be configured such that the bypass circuit is provided with a valve that controls a flow rate of the refrigerant flowing into the bypass circuit, and the valve is located above the first heat exchanger in a vertical direction.

The heat pump of the present invention may be configured such that a second heat exchanger is provided between the outdoor heat exchanger and the indoor heat exchanger, and the valve is located above the second heat exchanger in the vertical direction.

The heat pump of the present invention may be configured such that a degree of opening of the valve is controlled in its opening direction when an outside air temperature is within a range of a predetermined temperature.

Effect of the Invention

According to the present invention, when an amount of refrigerant beyond a capacity of an outdoor heat exchanger flows into an outdoor heat exchanger, by causing the refrigerant to flow into the bypass circuit, an excessive flow of the refrigerant into the outdoor heat exchanger can be suppressed, thereby it is possible to improve a heat exchange efficiency.

BRIEF DESCRIPTION OF DRAWINGS

FIG. 3 shows a flow chart illustrating a flow of a commencement determination process to determine whether to commence a bypass control or not.

FIG. 4 shows a flow chart illustrating a process flow associated with an operation in the bypass control.

DESCRIPTION OF EMBODIMENTS

Now, a heat pump according to an embodiment of the present invention will be described below with reference to the drawings.

Figure 1:
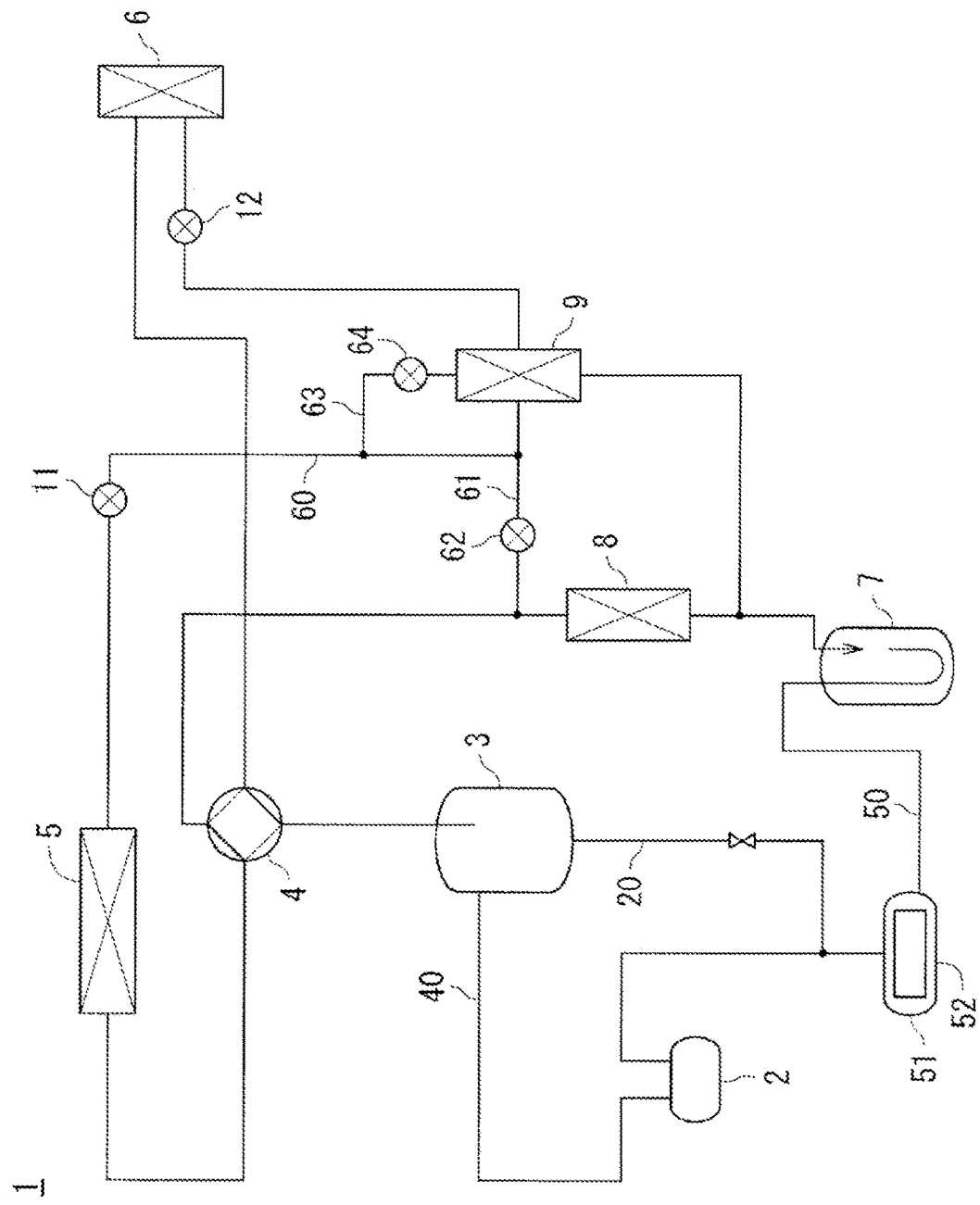
FIG. 1 shows a simplified circuit diagram of a refrigerant circuit of a heat pump according to an embodiment of the present invention.

FIG. 1 is a simplified circuit diagram illustrating a refrigerant circuit of a heat pump according to an embodiment of the present invention.

The heat pump 1 has an outdoor unit to perform heat exchange with outdoor air and an indoor unit to perform heat exchange with indoor air. The outdoor unit has a compressor 2, an oil separator 3, a four-way valve 4, an outdoor heat exchanger 5, an accumulator 7, a heat exchanger for evaporation 8, a heat exchanger for cooling 9, and an outdoor expansion valve 11. The indoor unit has an indoor heat exchanger 6 and an indoor expansion valve 12.

The compressor 2 is driven with a driving source such as a gas engine, for example. A plurality of compressors 2 may be connected in parallel. Each of the plurality of compressors 2 may be driven with a single gas engine via a belt or a flywheel or selectively driven with it by providing a clutch. A discharge path 40 of the compressor 2 is connected to the four-way valve 4 via the oil separator 3.

High temperature and high pressure gaseous refrigerant discharged from the compressor 2 is directed to the outdoor heat exchanger 5 or the indoor heat exchanger 6 with the four-way valve 4. During a heating operation (solid line) the four-way valve 4 delivers the gaseous refrigerant to the indoor heat exchanger 6, and during cooling operation (one-dot chain line) the four-way valve 4 delivers the gaseous refrigerant to the outdoor heat exchanger 5.

During the heating operation, the indoor heat exchanger 6 transfers heat from the refrigerant to the indoor air and causes the gaseous refrigerant to change into a liquid state with low temperature and high pressure. Then, the refrigerant is delivered to the outdoor heat exchanger 5 via the indoor expansion valve 12 and the outdoor expansion valve 11. A degree of opening of each of the indoor expansion valve 12 and the outdoor expansion valve 11 is controlled by a controller or the like where appropriate.

During the heating operation, the outdoor expansion valve 11 expands the liquid refrigerant and causes the liquid refrigerant to change into a liquid state (fog state) with low temperature and low pressure. Then, the outdoor heat exchanger 5 transfers heat from the outdoor air to the refrigerant and causes the refrigerant to change into a gaseous state with low temperature and low pressure. After passing through the outdoor heat exchanger 5, the refrigerant passes through the four-way valve 4 and is delivered to a suction path 50 of the compressor 2.

An accumulator 7 is provided in a path between the four-way valve 4 and the compressor 2. The accumulator 7 temporarily stores the gaseous refrigerant. The gaseous refrigerant contains a small amount of the liquid refrigerant. These are separated in the accumulator 7, and the liquid refrigerant is accumulated in the accumulator 7.

A filter housing part 51 to accommodate a filter 52 is provided in the suction path 50 connecting the accumulator 7 and the compressor 2. The filter 52 adsorbs a foreign matter contained in the refrigerant. By providing the filter 52, dirt from the refrigerant and oil can be removed as well as the refrigerant and the oil can be kept clean. When a plurality of compressors 2 are provided, the filter housing part 51 may branches the path to multiple paths.

Furthermore, a heat exchanger for evaporation 8 (as an example of the first heat exchanger) is provided between the four-way valve 4 and the accumulator 7. The heat exchanger for evaporation 8 is defined as a heat exchanger which is heated with the gas engine of being the driving source for the compressor 2 and the like, for example. A cooling water for the gas engine can circulate through the heat exchanger for evaporation 8 so as to warm the refrigerant passing through the heat exchanger for evaporation 8.

The heat pump 1 is provided with a bypass circuit 61 to deliver the refrigerant, which is flown out of the indoor heat exchanger 6 and flown into the outdoor heat exchanger 5, to the heat exchanger for evaporation 8 during the heating operation. Specifically, the bypass circuit 61 branches from a path (connection path 60) connecting the indoor heat exchanger 6 (indoor expansion valve 12) and the outdoor heat exchanger 5 (outdoor expansion valve 11), and is connected to the upstream of the heat exchanger for evaporation 8 in the refrigerant flow direction (between the four-way valve 4 and the heat exchanger for evaporation 8). A bypass expansion valve 62 (as an example of a valve) is provided in the bypass circuit 61, and the flow rate of the refrigerant passing through the bypass circuit 61 is controlled depending on the degree of opening of the bypass expansion valve 62.

In the heat pump 1, when the amount of refrigerant beyond the capacity of the outdoor heat exchanger 5 flows into the outdoor heat exchanger 5, by causing the refrigerant to flow into the bypass circuit 61, an excessive flow of the refrigerant into the outdoor heat exchanger 5 can be suppressed, thereby it is possible to improve a heat exchange efficiency. Also, by connecting the bypass circuit 61 to the upstream of the heat exchanger for evaporation 8, the refrigerant can be surely delivered to the heat exchanger for evaporation 8. The bypass control when causing the refrigerant to flow into the bypass circuit 61 will be described later in detail with reference to FIGS. 3 and 4.

On the other hand, during a cooling operation, the high temperature and high pressure gaseous refrigerant discharged from the compressor 2 is delivered via the four-way valve 4 to the outdoor heat exchanger 5 which performs heat exchange with the outdoor air to bring the refrigerant into a low temperature and high pressure liquid state. The refrigerant having passed through the outdoor heat exchanger 5 is brought into a low temperature and low pressure liquid state (fog state) by passing through the indoor expansion valve 12.

Then, the refrigerant is delivered to the indoor heat exchanger 6 which performs heat exchange with the indoor air to bring the refrigerant into a low temperature and low pressure gaseous state. The refrigerant delivered from the indoor heat exchanger 6 is then delivered to the suction path of the compressor 2 after passing through the four-way valve 4 and the accumulator 7.

The oil separator 3 is provided in a path between the four-way valve 4 and the compressor 2. The oil separator 3 separates oil contained in the refrigerant. The oil separator 3 is connected to an oil return piping 20 to supply the separated oil to the compressor 2. The oil return piping 20 is connected to the suction path 50. A solenoid valve or the like may be provided in the oil return piping 20 and control supply of the oil.

The heat pump 1 is provided with the heat exchanger for cooling 9 (as an example of the second heat exchanger) to perform heat exchange between refrigerants passing through the path in order to improve a cooling efficiency. The heat exchanger for cooling 9 is provided in the connection path 60 between the outdoor expansion valve 11 and the indoor expansion valve 12. Furthermore, the connection path 60 has a branch path 63 which branches from the upstream of the heat exchanger for cooling 9 in the refrigerant flowing direction. The branch path 63 is connected between the heat exchanger for evaporation 8 and the accumulator 7 through a branch expansion valve 64 and the heat exchanger for cooling 9.

The cooling heat exchanger for cooling 9 performs heat exchange between the low temperature and low pressure liquid refrigerant delivered to the indoor expansion valve 12 through the connection path 60 and the refrigerant which is changed to the low temperature and low pressure liquid state (fog state) through the branch path 63 and the branch expansion valve 64. Namely, the refrigerant to be delivered to the indoor expansion valve 12 through the connection path 60 is distributed into a refrigerant passing through the connection path 60 as it is and a refrigerant passing through the branch path 63 branching from the connection path. As a result, in the heat exchanger for cooling 9, the liquid refrigerant passing through the connection path 60 is cooled by an atomized refrigerant passing through the branch path 63. The atomized refrigerant is gasified by absorbing heat of the liquid refrigerant and then is delivered to the accumulator 7. Thus, by providing the heat exchanger for cooling 9, the temperature of the refrigerant can be properly controlled as well as the heat exchange efficiency can be further improved.

In the cooling of the heat exchanger for cooling 9, a distribution ratio of the refrigerant between the connection path 60 and the branch path 63 may be regulated by controlling the degree of opening of the branch expansion valve 64, for example. Also in the heat exchanger for cooling 9, the connection path 60 and the branch path 63 only intersect, and the refrigerants passing therethrough never mix with each other.

The heat pump 1 may have various sensors or the like in the refrigerant circuit where appropriate and be configured to detect temperature, a flow rate, pressure, etc. of the refrigerant, the outside air, and the cooling water on the basis of outputs from the sensors or the like. A controller may also be provided to control various valves or the like based on information acquired by the sensors or the like.

Figure 2:
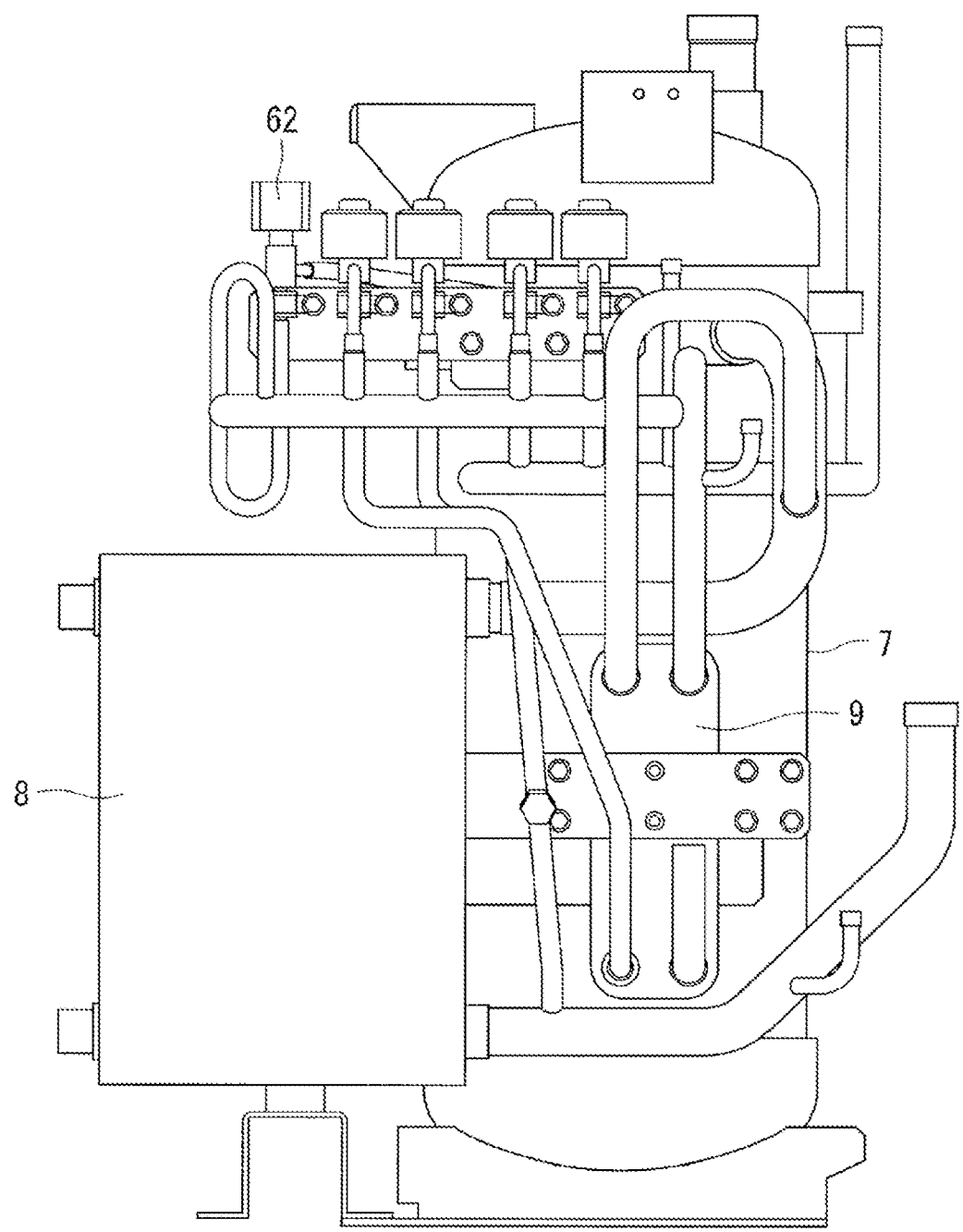
FIG. 2 shows a schematic side view of a structure around a heat exchanger for evaporation and a heat exchanger for cooling.

FIG. 2 is a schematic side view of a structure around the heat exchanger for evaporation and the heat exchanger for cooling.

FIG. 2 shows components with a part being exposed, which are ordinarily enclosed inside the outdoor unit. Specifically, FIG. 2 shows the accumulator 7, the heat exchanger for evaporation 8, the heat exchanger for cooling 9, the bypass expansion valve 62, and piping connected thereto. Components other than the components shown in FIG. 2 may be enclosed inside the outdoor unit as appropriate.

As shown in FIG. 2, the bypass expansion valve 62 is located above the heat exchanger for evaporation 8 and the heat exchanger for cooling 9 in the vertical direction. Although water droplets produced due to condensation, etc. may stick to the heat exchangers, the bypass expansion valve 62 can be free from such water droplets since the heat exchangers are located below the bypass expansion valve 62.

Other valves such as the outdoor expansion valve 11 and the branch expansion valve 64 may be placed in the vicinity of the bypass expansion valve 62, preferably so as to keep from the water droplets. In addition, by collecting a plurality of valves in the same place, workability in installation and maintenance can be improved.

Next, the bypass control when causing the refrigerant to flow into the bypass circuit 61 will be described below with reference to FIGS. 3 and 4.

FIG. 3 is a flow chart illustrating a flow of a commencement determination process to determine whether to commence the bypass control or not.

In this embodiment, the bypass control is performed during the heating operation. Therefore, an initial state of a process flow shown in FIG. 3 is set to the heating operation.

In step S01, it is determined whether outdoor unit condition is met or not. The outdoor unit condition is set with respect to an operation state of the outdoor unit. Specifically, when the degree of opening of the outdoor expansion valve 11 is not less than 80% and a degree of overheat of the refrigerant at the downstream of the heat exchanger for evaporation 8 is not less 25 degrees centigrade than a target temperature, it is determined that the outdoor unit condition is met. The degree of overheat of the refrigerant indicates a temperature difference between the saturation temperature of the refrigerant and the raised temperature of the refrigerant, and a target temperature for the degree of overheat of the refrigerant is set to a predetermined value. It may be determined that the outdoor unit condition is met when an outdoor-unit capability is also not less than 80%. The outdoor-unit capability is calculated based on a rating ratio of a theoretical refrigerant discharging amount of the compressor 2 (displacement volume of the compressor 2×a compressor rotating speed). As for a refrigerant, pressure can be converted to temperature. After a determination that the outdoor unit condition mentioned above is met (step S01:Yes) is made, the operation proceeds to step S02. On the other hand, if the outdoor unit condition is not met (step S01:No), the operation is suspended until the conditions are met.

In step S02, it is determined whether the outdoor air temperature condition is met or not. Here, it is determined whether the outdoor air temperature falls within a predetermined temperature range or not. Specifically, it is determined that the outdoor air temperature condition is met when the outdoor air temperature is not less than 5 degrees centigrade, or the outdoor air temperature is no more than −5 degrees centigrade. After a determination that the outdoor air temperature condition is met (step S02:Yes) is made, the operation proceeds to step S03. After a determination that the outdoor air temperature condition is not met (step S02:No) is made instead, the operation returns to step S01.

In step S03, it is determined whether the cooling water condition is met or not. Here, it is determined that the cooling water condition is met when the temperature of the cooling water passing through the heat exchanger for evaporation 8 is not less than 59 degrees centigrade. After a determination that the cooling water condition is met (step S03:Yes) is made, the operation proceeds to step S04. After a determination that the cooling water condition is not met (step S03:No) is made instead, the operation returns to step S01.

In step S04, the bypass control commences. The operation of the bypass control will be described below in detail with reference to FIG. 4.

As mentioned above, in the commencement determination process, the bypass control can commence only when all of three conditions of steps S01 through S03 are met. If even one condition is not met, the commencement determination process is restarted. When restarting the commencement determination process, the operation may be suspended until a predetermined time elapses. Furthermore, the commencement determination process may be performed at the same timing as detection by a sensor or the like, and the sensor or the like may acquire information periodically at predetermined time intervals.

FIG. 4 is a flow chart illustrating a process flow associated with an operation in the bypass control.

An initial state in FIG. 4 is just after the bypass control commences as a result of the commencement determination process shown in FIG. 3.

In step S11, the bypass expansion valve 62 is set to an initial degree of opening. Here, the initial degree of opening may be a predetermined value which is preset for each model of the heat pump 1, for example.

In step S12, the bypass expansion valve 62 is gradually opened. Here, the degree of opening of the bypass expansion valve 62 is controlled in a valve opening direction. In this embodiment, the degree of opening of the bypass expansion valve 62 is controlled so as to open by a predetermined amount in a 60-second cycle.

In step S13, it is determined whether the bypass expansion valve 62 reaches an upper limit of the degree of opening or not. The upper limit of the degree of opening may be predetermined. As a result, when the bypass expansion valve 62 reaches the upper limit of the degree of opening (step S13:Yes), the process can proceed to step S14. On the other hand, when the bypass expansion valve 62 does not reach the upper limit of the degree of opening (step S13:No), the process returns to step S12.

In step S14, the bypass expansion valve 62 is caused to follow the outdoor expansion valve 11. Specifically, the upper limit of the degree of opening of the bypass expansion valve 62 is set to the same value as the degree of opening of the outdoor expansion valve 11, as well as the degree of opening of the bypass expansion valve 62 is set to the same as the degree of opening of the outdoor expansion valve 11.

In the case where the bypass control is held, the operation in step S14 may continue. Meanwhile, the commencement determination process may be performed during the bypass control, and the bypass control may stop if at least one of the outdoor unit condition, the outdoor temperature condition, and the coolant condition is not met.

Since the capability of the outdoor heat exchanger 5 is affected by the outdoor air temperature, by controlling the delivery of the refrigerant to the heat exchanger for evaporation 8 according to it, an optimal heat exchange can be achieved. In addition, by setting the outdoor unit condition, the bypass control can be performed as necessary. Furthermore, by setting the cooling water condition, the bypass control can be performed in the case where the heat exchange in the heat exchanger for evaporation 8 can be carried out sufficiently.

It should be noted that embodiments disclosed above are exemplary in all respects, and the invention is not limitedly construed on a basis thereof. Therefore, the technical scope of the present invention should not be construed based on only above described embodiments but be defined based on the statement of the claims. Furthermore, any changes and modifications within the meaning and range equivalent to the claims fall within the scope of the invention.

This application claims the benefit of priority to Japanese Patent Application No. 2020-053961 filed as of Mar. 25, 2020. The entirety thereof is incorporated herein by reference. In addition, the entirety of the references cited is incorporated herein by reference.

DESCRIPTION OF REFERENCE NUMERALS

1 Heat pump
2 Compressor
3 Oil separator
4 Four-way valve
5 Outdoor heat exchanger
6 Indoor heat exchanger
7 Accumulator
8 Heat exchanger for evaporation (an example of the first heat exchanger)
9 Heat exchanger for cooling (an example of a second heat exchanger)
11 Outdoor expansion valve
12 Indoor expansion valve
20 Oil return piping
40 Discharge path
50 Suction path
51 Filter housing part
52 Filter
60 Connection path
61 Bypass circuit
62 Bypass expansion valve (an example of a valve)
63 Branch path
64 Branch expansion valve

The invention claimed is:

1. A heat pump configured to circulate a refrigerant for cooling and heating that includes an indoor heat exchanger, an outdoor heat exchanger connected to the indoor heat exchanger, and an accumulator connected to the outdoor heat exchanger, the heat pump comprising:
    a first heat exchanger provided between the outdoor heat exchanger and the accumulator; and
    a bypass circuit configured to cause the refrigerant that flows out of the indoor heat exchanger to flow into the first heat exchanger thereby bypassing the outdoor heat exchanger;
    wherein the bypass circuit includes a valve configured to have a degree of opening that is controlled in an opening direction thereof when an outside air temperature is within a range of a predetermined temperature, wherein the degree of opening comprises partially opening the valve in the opening direction.

2. The heat pump according to claim 1, wherein the bypass circuit branches from a path connecting the indoor heat exchanger and the outdoor heat exchanger and is connected to an upstream of the first heat exchanger in a refrigerant delivery direction.

3. The heat pump according to claim 1, wherein:
    the valve is configured to control a flow rate of the refrigerant flowing into the bypass circuit, and
    the valve is located above the first heat exchanger in a vertical direction.

4. The heat pump according to claim 3, further comprising:
    a second heat exchanger provided between the outdoor heat exchanger and the indoor heat exchanger, and
    wherein the valve is located above the second heat exchanger in the vertical direction.

5. The heat pump according to claim 1, further comprising a second heat exchanger provided between the outdoor heat exchanger and the indoor heat exchanger.

6. The heat pump according to claim 1, further comprising a controller configured to control the valve to control a flow rate of the refrigerant flowing into the bypass circuit.

7. The heat pump according to claim 6, further comprising an outdoor expansion valve, wherein the controller is configured to control the valve based on:
    a degree of opening of the outdoor expansion valve; and
    a degree of overheat of the refrigerant downstream the first heat exchanger.

8. The heat pump according to claim 6, wherein the controller is configured to control the valve based on a temperature of cooling water passing through the first heat exchanger.

9. A heat pump configured to circulate a refrigerant for cooling and heating, the heat pump comprising:
    an indoor heat exchanger;
    an outdoor heat exchanger connected to the indoor heat exchanger;
    an accumulator connected to the outdoor heat exchanger;
    a first heat exchanger provided between the outdoor heat exchanger and the accumulator;
    a second heat exchanger provided between the outdoor heat exchanger and the indoor heat exchanger; and
    a bypass circuit configured to cause the refrigerant that flows out of the indoor heat exchanger to flow into the first heat exchanger,
    wherein the bypass circuit includes a valve that is configured to control a flow rate of the refrigerant flowing into the bypass circuit, and
    wherein the valve is located above the first and second heat exchangers in a vertical direction.

* * * * *